United States Patent Office 3,253,157
Patented May 24, 1966

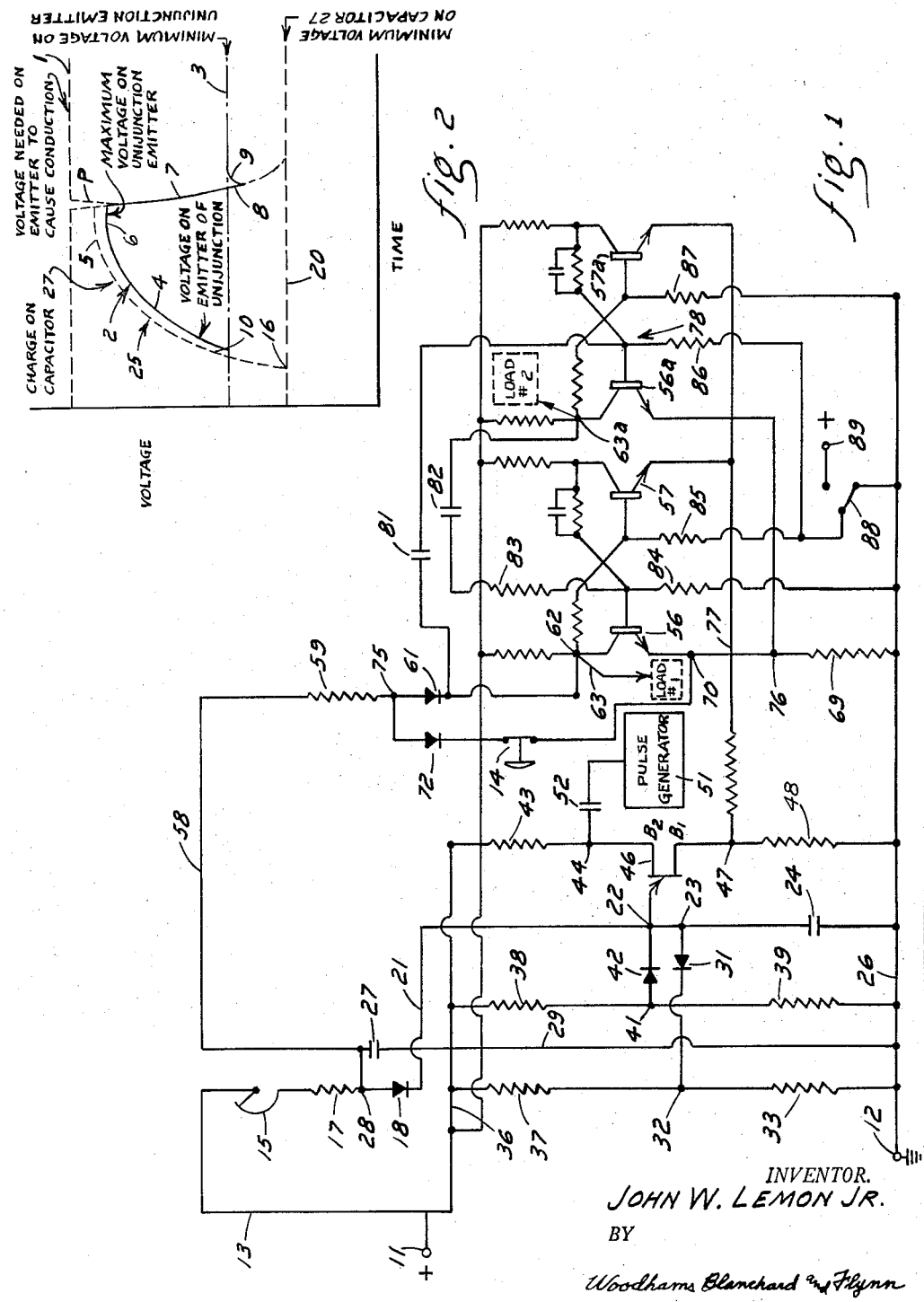

3,253,157
TIMING CIRCUIT FOR ACTUATING A LOAD IN ACCURATE RELATIONSHIP TO TWO INPUTS
John W. Lemon, Jr., Berkley, Mich., assignor to Robotron Corporation, Detroit, Mich., a corporation of Michigan
Filed Feb. 8, 1963, Ser. No. 257,175
9 Claims. (Cl. 307—88.5)

This invention relates to electrical timing circuits and particularly to a type thereof for producing an output signal pulse as the result of the occurrence of at least two events, one of which is the supply of an input pulse to the timing circuit.

In many types of timing circuits it is desirable to provide an output signal pulse immediately upon the occurrence of an input pulse but only after the elapsing of a predetermined minimum period of time following the occurrence of another event. In many kinds of electronic timers an electrical potential is caused to charge a capacitor and the time required to place a predetermined charge on said capacitor functions to establish said minimum period of time. At some time after the capacitor attains such charge, means are employed to discharge said capacitor and the pulse obtained from such discharge is used as the output signal.

If the charging period for the capacitor is relatively long, such as a time period corresponding to several or more cycles of a 60-cycle A.C. source, known circuits are reasonably accurate and variations in the precise moment at which a triggering pulse occurs will not materially affect the accuracy of the point at which the output signal is transmitted. However, where the capacitor is caused to charge in a very short period of time, such as a time period corresponding to one cycle or less of a 60-cycle A.C. source, previous known circuits for triggering the discharge of such a capacitor have either been complex, hence expensive to manufacture and maintain or they have had something less than fully satisfactory accuracy.

One particular circuit in which the present invention may be used to advantage is the circuit disclosed in my application Serial No. 187,165, filed April 11, 1962, wherein a condenser is caused to charge to a preselected value at which point it breaks down the resistance of a unijunction transistor and current from said condenser then flows through said unijunction transistor and the desired signal pulse can be taken from any convenient point in the discharge circuit. However, because of variations in the levels at which a unijunction transistor will become conductive, due to variations between unijunction transistors or due to variations in one unijunction transistor at different periods during its useful life, the interval between the pulses produced in this manner may not be exactly equal.

Accordingly, the objects of the invention include:

(1) To provide an electrical circuit for producing an output pulse in response to a suitably supplied input pulse, successive output pulses being separated from each other by an accurately predetermined, minimum period of time.

(2) To provide a circuit, as aforesaid, which can be operated to provide the desired output pulses accurately at any desired time following a predetermined minimum time period.

(3) To provide a circuit, as aforesaid, wherein said predetermined minimum charging time may be as short as a time period corresponding to one-quarter cycle, or even somewhat less, of a 60-cycle A.C. source.

(4) To provide a circuit, as aforesaid, wherein the signal will occur only at the end of a pulse, whereby to maintain accurate synchronism even at the short-time-period end of the timing range.

(5) To provide a circuit, as aforesaid, wherein timing is of full cycles and will hence effect a more accurate control than if it were permitted to effect function changes during a cycle.

(6) To provide a circuit, as aforesaid, in which the minimum period of time is established by the time required to charge a capacitor.

(7) To provide a circuit, as aforesaid, in which both the minimum and maximum potential levels of the capacitor are accurately controlled in order to accurately control the time it takes to charge the capacitor.

(8) To provide a circuit, as aforesaid, which can be accurately adjusted to suit the characteristics of the individual components which comprise the circuit so as to accommodate variations in the characteristics of said components.

Other objects and purposes of the invention will be apparent to persons acquainted with circuits of this general type upon reading the following disclosure and inspecting the accompanying drawings.

In the drawings:

FIGURE 1 is a diagram of a preferred circuit embodying the invention.

FIGURE 2 is a time-vs.-voltage diagram of the charge on the emitter of the unijunction transistor of the circuit of FIGURE 1 which also corresponds approximately to the charge on the capacitor.

General description

In general, the invention provides a circuit which controls the time at which a load is energized in response to two occurrences, one of which involves charging a capacitor to such a level that it can make it possible for conduction of a unijunction transistor to occur when a firing pulse is supplied to one of the bases thereof, and the other of which is the actual supply of the firing pulses itself. The capacitor must be charged to the aforementioned level before the firing pulse can be effective to cause conduction and, thus, firing pulses supplied prior to such charging are ineffective.

The general principle upon which the circuit is based will be apparent from a consideration of FIGURE 2 which shows a time-vs.-voltage diagram of the voltage on the emitter of the unijunction transistor at various times during the operation of the circuit. The broken line 1 indicates the emitter voltage necessary to cause conduction of the unijunction transistor under the bias conditions which exist at all times except when a firing pulse is supplied to one base of said transistor. The solid line 2 indicates the potential on the unijunction emitter which is responsive to the charge on the hereinafter-mentioned capacitor 27. The chain dotted line 3 indicates the minimum potential level which exists on such emitter at the start of a timing operation. This is determined by the charge which exists upon another capacitor 24. The minimum charge on the capacitor 27 is indicated by the line 20. The chain dotted line 25 indicates the charge on the capacitor 27 as the operation progresses. The circuit of the invention involves charging the first-mentioned capacitor 27 and thereby increasing the emitter voltage beginning at the time indicated at point 10 as indicated by the portion 4 of line 2 until a maximum emitter voltage level is established at the time indicated at point 5. This maximum emitter voltage level which corresponds approximately to a maximum charge on the capacitor 27 is maintained, as indicated by the flat portion 6, until a firing pulse P occurs. Such pulse changes the bias conditions on the unijunction transistor such that the maximum emitter voltage is then sufficient to cause conduction of the unijunction transistor. When such occurs, the capacitor 27 discharges and the emitter voltage decreases sharply as indicated by the portion 7. The unijunction transistor then ceases to conduct.

It is a fundamental purpose of the circuit to insure that the charge on the capacitor 27 be increased to its maximum level during a precisely controlled time in order to insure a fixed minimum time period between successive firings of the unijunction transistor. It may happen that the capacitor 24 may discharge below the line 3 when the unijunction transistor conducts, as indicated by the portion 8 and, therefore, the circuit provides means for insuring that the capacitor 24 is charged as indicated by portion 9 to the fixed level indicated by line 3 before the next charging thereof to the maximum level begins.

*Detailed description*

Referring to FIGURE 1, the circuit comprises a pair of terminals 11 and 12. Terminal 11 is connected to the positive side of a source of D.C., or rectified A.C., potential while the terminal 12 is connected to ground. A first conductor 13 is connected to the terminal 11. A rheostat 15, a resistance 17 and a further rectifier 18 are connected in series between the conductor 13 and a conductor 21. The conductor 21 has a pair of junction points 22 and 23 therein and it also has a capacitor 24 connected therein between the junction point 23 and a conductor 26. The conductor 26 is connected to the terminal 12.

One side of a capacitor 27 is connected to a junction point 28 which is located between the resistance 17 and the rectifier 18. The other side of the capacitor 27 is connected by a conductor 29 to the conductor 26. Thus, when the hereinafter referred to switch 14 is opened and transistor 56 is non-conductive, the capacitor 27 is charged through a circuit including line 13, rheostat 15, resistance 17 and conductor 29.

Junction point 23 is connected through a rectifier 31 to a junction point 32 thence through a resistance 33 to the conductor 26. The circuit which comprises the rectifier 18, rectifier 31 and resistance 33 is connected in parallel with the capacitor 27 between the junction point 28 and the conductor 26. The value to which capacitor 27 can be charged is determined by the potential drop which exists across the circuit elements which are connected in parallel therewith. Thus, this parallel circuit establishes the maximum charge which can be placed on the capacitor 27 and this charge is proportional to the charge indicated by the portion 6 in FIGURE 2. The rate of charging of the capacitor 27 is determined by the setting of the rheostat 15 which is selected so as to provide the desired time period for charging the capacitor. Thus, the setting of the rheostat 15 establishes the time period between points 16 and 5 on the diagram of FIGURE 2.

A further conductor 36 is connected to the input terminal 11 and a plurality of subcircuits are connected in parallel between it and the conductor 26. The first subcircuit is a voltage divider circuit and it is comprised of a resistance 37 which is connected to the junction point 32 and thence through the resistance 33 to the conductor 26. The resistances 33 and 37, therefore, establish a fixed voltage at point 32 and thus establish the maximum potential (line 6 in FIGURE 2) which can exist at point 22.

The second subcircuit also is a voltage divider circuit and it is comprised of series connected resistances 38 and 39. A junction point 41 between resistances 38 and 39 is connected to a rectifier 42 which in turn is connected to the junction point 22. The resistances 38 and 39 are so related to each other that the potential at junction point 41 and, therefore, the potential at junction point 22 has a minimum level corresponding to the level indicated by the line 3 in FIGURE 2. Thus, if the potential at point 22 drops below the level indicated by the line 3 in FIGURE 2, it is quickly brought up to such level by flow of energy through the voltage divider circuit including the resistance 38.

The third subcircuit comprises a resistance 43 which is connected through a junction point 44 to one base $B_2$ of a unijunction transistor 46. The other base $B_1$ of the transistor 46 is connected to a junction point 47, thence through a resistance 48 to the conductor 26. The resistances 43 and 48 provide a bias on the unijunction transistor 46 at such a level that the emitter voltage necessary to cause conduction of said transistor is at the high level indicated by the broken line 1 in FIGURE 2, the resistance 48 being appreciably less than the resistance 43. Since the voltage on the emitter of unijunction transistor 46, as indicated by the solid line 2 in FIGURE 2, never reaches this level, the transistor 46 is normally nonconductive. The emitter of the transistor 46 is connected to the junction point 22.

A pulse generator 51 is connected through a coupling capacitor 52 to the junction point 44. The pulse generator 51 may be of any suitable conventional type and may supply firing pulses to the junction point 44 at either regular or irregular intervals. When such pulses do occur, as indicated at P in FIGURE 2, they lower the biasing potential on the unijunction transistor 46 and, therefore, lower the required emitter firing voltage so that the potential on the emitter then is sufficient to effect conduction of the transistor 46. Thus, if the potential on the emitter is at the level indicated by portion 6 of line 2 in FIGURE 2, which corresponds to the fully charged condition of the capacitor 27, the transistor conducts forthwith. Desirably, the initiating pulse supplied by the pulse generator 51 is as short and sharp as practicable (subject to the characteristics of the unijunction) and of the desired amplitude and polarity in order to provide the exact timing.

When the transistor 46 becomes conductive, the capacitor 27 discharges through the rectifier 18, conductor 21, point 22, transistor 46 and resistance 48 to conductor 26. This provides an output pulse at the junction point 47. Thus, the occurrence of the output pulse is controlled by two events, (1) the charging of the capacitor 27 to such a level that the transistor 46 can become conductive when an input pulse is supplied at junction point 44, and (2) the actual occurrence of the input pulse at junction point 44. Thus, the time that it takes to charge the capacitor 27 to its maximum level, that is, the time between points 16 and 5, establishes the earliest point at which the transistor 46 can become conductive and the next input pulse appearing at junction point 44 determines the actual time at which conduction occurs.

Capacitor 24 is provided in order to keep the unijunction transistor 46 conductive long enough to insure complete discharge of the capacitor 27. Tests have shown that if this capacitor is not provided, the transistor 46 will fire and then will be extinguished before the capacitor 27 is fully discharged. The capacitor 24 charges simultaneously with the capacitor 27 and when the transistor 46 is fired it discharges through the transistor and keeps same conductive for a sufficient period of time to allow current to begin to flow through diode 18 to fully discharge capacitor 27.

While a variety of different loads can be actuated by pulses supplied to junction point 47, a particularly advantageous load, which cooperates with the capacitor 27, is shown for purposes of illustration. This load is comprised of a bistable circuit including two transistors 56 and 57 arranged so that the transistor 57 is normally conductive and transistor 56 is nonconductive. A conductor 58 connects the positive side of the capacitor 27 to circuitry including a resistance 59 and a rectifier 61 which are connected in series to a junction point 62 thence to the collector of a transistor 56.

A rectifier 72 and a switch 14 are connected in series between junction points 75 and 70. Junction point 75 is located between resistance 59 and rectifier 61 and junction point 70 is connected to the emitter of transistor 56. The switch 14, therefore, is connected in parallel with transistor 56 and provides an alternate path for charging the capacitor 27 to the minimum level indicated by line 20 in FIGURE 2. Hence when either transistor 56 is conductive or switch 14 is closed, the capacitor 27 is charged to the minimum level. When both transistor 56 is nonconductive and switch 14 is open, then the capacitor 27 is charged to its maximum level through rheostat 15, resistance 17 and conductor 29.

A resistance 69 is connected between junction point 76 and line 26. Additional bistable circuits, one of which is shown generally at 78, can be added to the line 77 and junction point 76.

When a pulse appears at point 47, transistor 57 becomes nonconductive and transistor 56 becomes conductive. Further load devices responsive to operation of the bistable circuits may be connected to conductors 63 and 63a.

A resetting device may be incorporated in the load shown wherein said device includes the capacitors 81 and 82, the resistances 83, 84, 85, 86 and 87 and the switch 88. The capacitor 81 connects the lower end of the diode 61 to the series circuit comprising the base of the transistor 56a, the resistance 86, and the primary terminal of the switch 88. The capacitor 82 connects the output end of the transistor 56a to the series string comprising the resistance 83, the base of the transistor 56, the resistance 84, and the ground line 26. The resistance 85 is connected between the base of the transistor 57 and the primary terminal of the switch 88. The resistance 87 connects the base of the transistor 57a to ground. Connection of the switch 88 to the positive source 89 causes the transistors 57 and 56a to conduct continuously in the reset condition. Connection of the switch 88 to ground requires initiation by opening of the switch 14 to cause the circuit to cycle in its intended manner.

Any residual charge on the capacitor 27 will be permitted to discharge to the predetermined minimum level which is proportional to the level indicated by line 20 when the transistor 56 is conductive or switch 14 is closed. Thus, any variations in the predetermined minimum level of charge in the capacitor 27 are eliminated.

*Operation*

The operation of the circuit has been indicated before but same will be briefly repeated in order to insure a complete understanding of the invention.

When the switch 14 is closed the capacitor 27 will be at its minimum charge level, indicated by line 20 and, therefore, the potential on the emitter of the unijunction transistor 46 will be maintained at the level indicated by the line 3 due to the charge on capacitor 24. Further, the bias on the unijunction transistor 46 is such that the emitter potential necessary to cause conduction thereof is substantially above the actual emitter potential. Thus, the unijunction transistor 46 is nonconductive. Pulses supplied by the pulse generator 51 at this time are ineffective to cause conduction of the transistor 46 because they do not reduce the bias to such a level that the actual emitter voltage is sufficient to cause conduction thereof.

When the switch 14 is opened (transistor 56 being nonconductive), the capacitor 27 commences to charge at a predetermined rate as determined by the setting of the potentiometer 15. This effects a rise in the level of the emitter voltage as indicated by the portion 4 of the solid line 2 in FIGURE 2. When the voltage reaches the level indicated by the portion 6 in FIGURE 2, further charging of the capacitor 27 and, therefore, further raising of the potential at the emitter is prevented (by the escape thereof through the resistance 33) so that the actual emitter potential is maintained at this maximum level. This level is such that it is not sufficient under the normal biasing conditions existing on the transistor 46 to effect conduction of the transistor. However, when the next firing pulse P is supplied by the pulse generator 51, this modifies the biasing conditions on the transistor 46 so that the emitter voltage necessary to cause conduction thereof is decreased as indicated in FIGURE 2. The firing pulse P has sufficient amplitude to reduce the emitter voltage necessary to cause conduction well below the actual emitter voltage indicated by portion 6. Therefore, minor variations in the level indicated by line 1 which may be caused by differences between transistors do not appreciably affect the operation. Thus, the emitter voltage necessary to cause conduction of the transistor is present on the emitter thereof so that the transistor 46 conducts forthwith. When such occurs, the charges on the capacitors 27 and 24 are discharged to their minimum levels through the transistor 46 and this provides an output pulse at junction point 47 which is the output of the circuit of the present invention. Such output is supplied to the load shown and makes transistor 56 conductive and transistor 57 nonconductive. This also reverses the conductive condition of the transistors of circuit 78. In addition, any further load devices connected to conductors 63 and 63a are actuated.

If the charge on the capacitor 24 should drop below the minimum level, corresponding to the potential on point 22 indicated by line 3, the charge on the capacitor 24 is immediately raised to a value (line 3) corresponding to the minimum emitter voltage. Since the transistor 56 is conductive, the capacitor 27 will be maintained at its minimum charge level even though switch 14 remains open. The charge on capacitor 27 is close to the potential at point 70.

In this fashion, by insuring a fixed minimum and fixed maximum charge on the capacitor 27, it is possible to accurately control the minimum time period between the closing of the switch and the firing of the unijunction transistor 46.

The capacitor charging period which can be accommodated by the circuit of the invention can be extremely small, such as a time period corresponding to one-quarter of a 60-cycle A.C. supply potential. While the shortest timing interval output will be equal to the spacing of the pulses supplied to junction point 44, the circuit will time longer periods triggering synchronously with these pulses equally well.

It will be noted that the capacitor 24 is charged and discharged simultaneously with capacitor 27. Therefore, in appropriate cases the capacitor 27 and line 29 can be eliminated and the capacitor 24 can be used to measure the time period.

While a particular preferred embodiment of the invention has been described above, the invention contemplates such changes or modifications therein as lie within the scope of the appended claims.

What is claimed is:

1. A timing circuit for actuating a load in accurate and predetermined relationship to the occurrence of events in at least two distinct input systems, comprising in combination:
  a unijunction transistor having an emitter and two bases and biasing means connected to one of said bases so that a predetermined bias is maintained thereon;
  means connecting one of said input systems to said one base whereby the bias on said one base can be modified;
  a first capacitor and a first charging circuit for said capacitor, said first charging circuit being connected to the other input system;
  a first discharging circuit for said first capacitor including a connection to said emitter and thence through the other base of said unijunction transistor;
  a voltage limiting circuit connected to said first capacitor for limiting the maximum charge thereon;
  a second capacitor connected to said emitter and across a portion of said discharging circuit to maintain conduction of said unijunction transistor until said first capacitor has discharged at least to a preselected minimum value;

a load connected to said discharging circuit; and a supplemental charging circuit connected to said second capacitor for establishing a minimum charge thereon when said first charging circuit is ineffective.

2. The device defined in claim 1 including:

means connected to said first capacitor for normally blocking same from charging past said preselected minimum level, said means being actuable for allowing said first capacitor to charge past said minimum level, said minimum level of charge on said first capacitor being less than said minimum charge on said second capacitor.

3. In a timing circuit for allowing conduction of a unijunction transistor having an emitter after a timed interval and upon application of a preselected signal, the combination comprising:

means for maintaining the voltage on said emitter at least above a first minimum voltage, said first minimum voltage being less than that required for allowing conduction of said unijunction transistor;

a timing capacitor;

charging means for charging said timing capacitor as a function of time;

blocking means actuable to block said charging means in order to maintain the voltage on said timing capacitor below a preselected second minimum, said second minimum being less than said first minimum;

unidirectional conducting means connecting said timing capacitor to said emitter for allowing said timing capacitor to raise the voltage on said emitter but preventing charging of said timing capacitor by a voltage on said emitter;

whereby deactuation of said blocking means allows said timing capacitor to charge and bias said emitter to allow conduction of said unijunction transistor after a timed interval, said timed interval being independent of the emitter voltage at the instant of said deactuation.

4. A timing circuit comprising in combination:

a unijunction transistor having an emitter and two bases;

biasing means capable of providing a predetermined voltage to said base;

a first capacitor;

a series circuit comprising isolating means and a second capacitor, said isolating means being capable of limiting the extent to which the voltage across said first capacitor exceeds the voltage across said second capacitor;

charging means for applying an increasing voltage across said first capacitor and said series circuit;

switch means energizable for limiting the voltage applied by said charging means across said first capacitor and said series circuit to a predetermined first minimum level;

further charging means for maintaining the voltage across said second capacitor above a second minimum level, said second minimum level exceeding said first minimum level;

means for limiting the maximum voltage which can be applied by said charging means across said first capacitor and said series circuit when said switch means is de-energized, said maximum voltage exceeding said second minimum level;

means connecting said second capacitor to said emitter for causing conduction of said unijunction transistor in response to application of said preselected voltage to said base while said first capacitor has said maximum voltage thereacross.

5. A timing circuit for energizing a load subsequent to an event in one input system and in synchronism with an event in another input system, comprising the combination:

a source of D.C. potential and a pair of conductors connected to opposite sides of said D.C. source;

a first voltage divider connected to and between said conductors and a unijunction transistor having an emitter and a pair of bases, said bases being connected in said first voltage divider at a point intermediate the ends thereof for providing a constant D.C. bias on said bases;

a timing capacitor and a time constant determining resistance in a series path therewith, said series path being connected to and between said conductors in parallel with said first voltage divider for charging said capacitor at a predetermined rate independent of the rate of current flow through said unijunction transistor;

conductive means connecting the side of said capacitor adjacent said time constant resistance to the emitter of said unijunction transistor;

a switch connected in parallel with said capacitor and to said resistor side thereof, said switch being closable for shunting said capacitor to prevent charging thereof above a preselected shunt charge level;

a second voltage divider connected to and between said conductor pair in parallel with said first voltage divider and a diode connected from an intermediate point on said second divider to said emitter, the anode of said diode being connected to said emitter to limit the voltage on said emitter to a maximum level below that required to cause conduction through said unijunction with said constant D.C. bias on said bases and to limit the charge on the capacitor to a corresponding maximum charge;

a third voltage divider connected to and between said conductor pair in parallel with said second voltage divider and a further diode connected from an intermediate point on said third voltage divider to said emitter, said intermediate point on said second voltage divider being maintained at a lower D.C. potential than said intermediate point on said third divider, the cathode of said further diode being connected to said emitter for preventing the charge on said capacitor from dropping below a constant, nonzero minimum charge corresponding to a minimum emitter voltage spaced below said maximum level, said minimum charge level being at least as great as said shunt charge level;

a source of regularly spaced, negative pulses connected to the positively biased one of said bases for periodically lessening the potential drop across said bases, said unijunction transistor being capable of conduction only upon coincidence of an emitter voltage level substantially equal to said maximum voltage and one of said negative pulses, conduction of said unijunction transistor discharging said capacitor at least to said minimum level of charge;

a load connected to the other of said bases, said load including means responsive to conduction of said unijunction transistor through said switch for closing said switch;

whereby the minimum time required to energize said load as determined by the charging time of said capacitor is constant in the face of variations of the source voltage and of the shunt voltage drop occurring across the capacitor with the switch closed.

6. A timing circuit for energizing a load subsequent to an event in one input system and in synchronism with an event in another input system, comprising the combination:

a source of D.C. potential and a pair of conductors connected to opposite sides of said D.C. source;

a first voltage divider connected to and between said conductors and a unijunction transistor having an emitter and a pair of bases, said bases being connected in said first voltage divider at a point intermediate the ends thereof for providing a constant D.C. bias on said bases;

a timing capacitor and a time constant determining resistance in a series path therewith, said series path being connected to and between said conductors in parallel with said first voltage divider for charging said capacitor at a predetermined rate;

conductive means connecting the side of said capacitor adjacent said time constant resistance to the emitter of said unijunction transistor for placing a voltage on said emitter corresponding to the charge on said capacitor;

a switch connected in parallel with said capacitor, said switch being closable for shunting said capacitor to prevent charging thereof above a preselected shunt charge level;

voltage divider circuitry connected to and between said conductor pair in parallel with said first voltage divider and a diode connected from one intermediate point on said voltage divider circuitry to said emitter, the anode of said diode being connected to said emitter to limit the voltage on said emitter to a maximum level below that required to cause conduction through said unijunction with said constant D.C. bias on said bases and to limit the charge on the capacitor to a corresponding maximum charge;

a further diode connected from a further intermediate point on said voltage divider circuitry to said emitter, said further intermediate point being maintained a higher D.C. potential than said one intermediate point, the cathode of said further diode being connected to said emitter for preventing the charge on said capacitor from dropping below a constant, non-zero minimum charge corresponding to a minimum emitter voltage spaced below said maximum level, said minimum charge level being at least as great as said shunt charge level;

a source of regularly spaced, negative pulses connected to the positively biased one of said bases for periodically lessening the potential drop across said bases, said unijunction transistor being capable of conduction only upon coincidence of an emitter voltage level substantially equal to said maximum voltage and one of said negative pulses, conduction of said unijunction transistor discharging said capacitor at least down to said minimum level of charge;

a load connected to the other of said bases;

whereby the minimum time required to energize said load as determined by charging time of said capacitor is constant in the face of variations of the source voltage and of the shunt voltage drop occurring across the capacitor with the switch closed.

7. A timing circuit for actuating a load in accurate and predetermined relationship to the occurrence of events in at least two distinct input systems, comprising in combination:

a D.C. potential source;

a unijunction transistor having an emitter and two bases and biasing means connected to said bases and to said D.C. potential source so that a predetermined D.C. bias is maintained thereon;

means connecting one of said input systems to one base thereby the bias on said one base can be modified;

a timing capacitor and a charging circuit for said capacitor, said charging circuit being connected to said D.C. potential source in response to an event in the other input system;

a discharging circuit for said timing capacitor including a connection from said timing capacitor to said emitter and thence through the other base of said unijunction transistor;

a voltage limiting circuit connected to said emitter for limiting the maximum voltage thereon;

a load connected to said discharging circuit; and a voltage divider connected across said D.C. potential source and a diode connected to an intermediate point thereon and to said timing capacitor for establishing a minimum nonzero charge thereon when said charging circuit is ineffective;

said voltage limiting circuit and supplemental charging circuit precisely determining the minimum time required to effect conduction of said unijunction transistor regardless of variations in said D.C. supply.

8. The circuit defined in claim 7 including a switch connected in parallel with said capacitor and means rendering said switch path conductive as a result of conduction of said unijunction transistor whereby said capacitor can discharge through said switch to a predetermined value at least as low as said minimum charge regardless of the characteristics of said unijunction transistor.

9. A timing circuit for actuating a load subsequent to the occurrence of events in at least two distinct input systems, comprising in combination:

a D.C. potential source;

a unijunction transistor having an emitter and two bases and means connected between said bases and said D.C. potential source so that a predetermined D.C. bias is maintained across said bases;

means connecting one of said input systems to one of said bases whereby the bias on said one base can be lessened;

a capacitor and a charging circuit for said capacitor, said charging circuit being connected to the other input system;

a discharging circuit for said capacitor including a connection from said capacitor to said emitter and thence through the other base of said unijunction transistor;

a voltage divider connected across said D.C. source and a diode having an anode connected to said emitter and a cathode connected to an intermediate point on said voltage divider for maintaining the voltage on said emitter below a maximum value, said maximum value being below that required to cause conducting of said unijunction transistor with said bias across said bases;

a load connected to said other base;

said voltage divider and diode precisely determining the minimum time required to effect conduction of said unijunction transistor regardless of variations in said D.C. supply.

References Cited by the Examiner

UNITED STATES PATENTS

| | | | |
|---|---|---|---|
| 2,937,289 | 5/1960 | Aldrich et al. | 307—88.5 |
| 2,997,665 | 8/1961 | Sylvan | 307—88.5 |
| 3,018,384 | 1/1962 | Zrubek | 307—88.5 |
| 3,045,150 | 7/1962 | Mann | 307—88.5 |
| 3,092,729 | 6/1963 | Cray | 307—88.5 |
| 3,127,522 | 3/1964 | Thorndyke | 307—88.5 |
| 3,128,396 | 4/1965 | Morgan | 307—88.5 |
| 3,206,612 | 5/1965 | Swanekamp et al. | 307—88.5 |

OTHER REFERENCES

G. E. notes on the application of "Silicon Unijunction Transistor," by Sylvan, pages 48 and 59–64.

ARTHUR GAUSS, *Primary Examiner.*

DAVID J. GALVIN, *Examiner.*

B. P. DAVIS, *Assistant Examiner.*